United States Patent
Kuboki

(10) Patent No.: US 7,972,716 B2
(45) Date of Patent: Jul. 5, 2011

(54) PERPENDICULAR MAGNETIC RECORDING MEDIUM

(75) Inventor: Yoshiyuki Kuboki, Matsumoto (JP)

(73) Assignee: Fuji Electric Device Technology Co., Ltd. (JP)

( * ) Notice: Subject to any disclaimer, the term of this patent is extended or adjusted under 35 U.S.C. 154(b) by 0 days.

(21) Appl. No.: 12/552,407

(22) Filed: Sep. 2, 2009

(65) Prior Publication Data
US 2010/0086809 A1    Apr. 8, 2010

(30) Foreign Application Priority Data
Sep. 2, 2008    (JP) .................... 2008-224793

(51) Int. Cl.
*G11B 5/66*    (2006.01)
(52) U.S. Cl. .................................. 428/831.2
(58) Field of Classification Search .......... None
See application file for complete search history.

(56) References Cited

U.S. PATENT DOCUMENTS

| | | |
|---|---|---|
| 2002/0182446 A1 | 12/2002 | Takenoiri et al. |
| 2005/0153169 A1 | 7/2005 | Watanabe et al. |
| 2006/0093867 A1* | 5/2006 | Takenoiri et al. ......... 428/831.2 |
| 2008/0024918 A1 | 1/2008 | Gouke |
| 2008/0075979 A1* | 3/2008 | Inamura et al. ......... 428/828 |
| 2009/0116137 A1* | 5/2009 | Takekuma et al. ......... 360/75 |

FOREIGN PATENT DOCUMENTS

| | | |
|---|---|---|
| JP | 2002-358617 A | 12/2002 |
| JP | 2004-310944 A | 11/2004 |
| JP | 2005-196898 A | 7/2005 |
| JP | 2008-034060 A | 2/2008 |
| JP | 2008-084413 A | 4/2008 |

OTHER PUBLICATIONS

T. Oikawa et al., "Microstructure and Magnetic Properties of CoPtCr—SiO2 Perpendicular Recording Media", IEEE Transactions on Magnetics, vol. 38, No. 5, Sep. 2002; cited in specification.

* cited by examiner

*Primary Examiner* — Holly Rickman
(74) *Attorney, Agent, or Firm* — Rossi, Kimms & McDowell LLP

(57) ABSTRACT

A magnetic recording medium exhibiting a high recording density performance is disclosed. The perpendicular magnetic recording medium has a soft magnetic underlayer, a first seed layer, a second seed layer, an intermediate layer, a granular magnetic recording layer, a non-granular magnetic recording layer, a protective layer, and a lubricant layer laminated on a nonmagnetic substrate in this order. The first seed layer contains cobalt, nickel, and at least one element selected from a group consisting of Si, Cr, V, Zr, Nb, Ta, Ti, Cu, and Mo, and the second seed layer contains nickel, chromium, and at least one element selected from a group consisting of Si, V, Zr, Nb, Ta, Ti, Cu, and Mo.

12 Claims, 1 Drawing Sheet

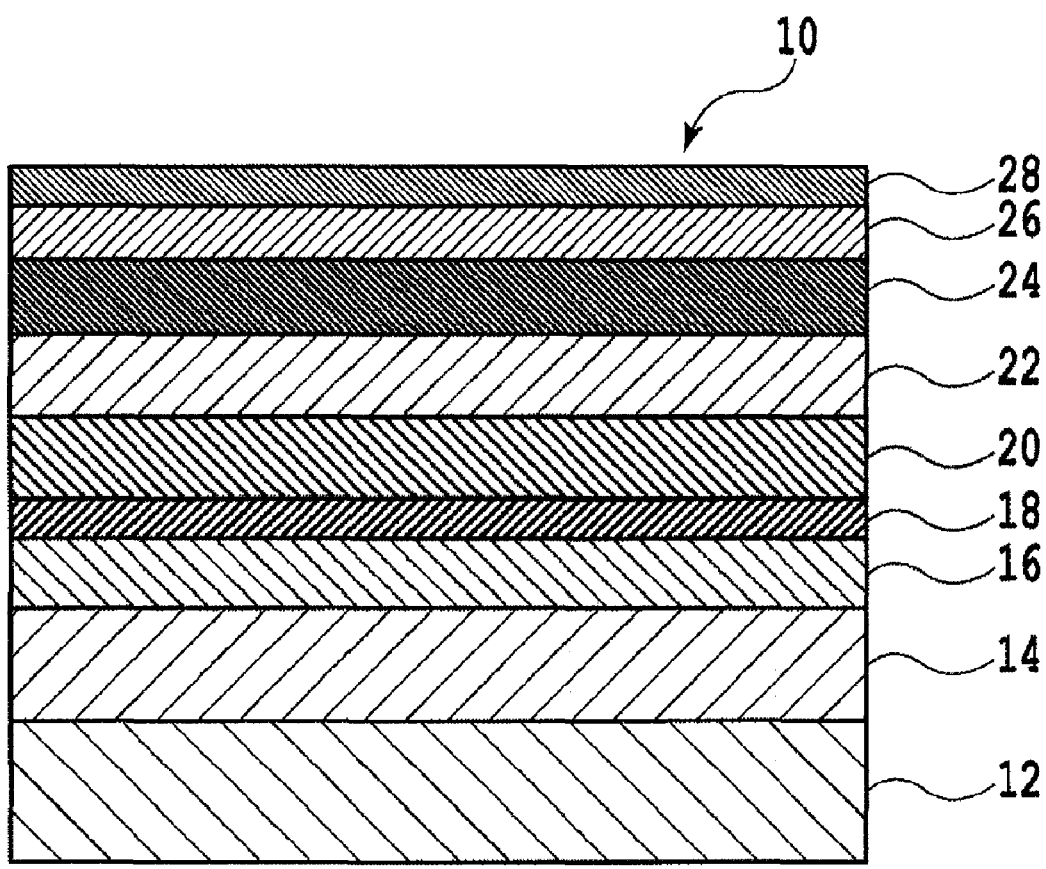

PERPENDICULAR MAGNETIC RECORDING MEDIUM

BACKGROUND OF THE INVENTION

A. Field of the Invention

The present invention relates to a perpendicular magnetic recording medium, in particular to a perpendicular magnetic recording medium that can attain high density magnetic recording.

B. Description of the Related Art

In order to achieve higher recording density, magnetic recording media used in hard disk drives (HDDs) are recently being switched over rapidly from the conventional longitudinal recording system to the perpendicular magnetic recording system. The perpendicular magnetic recording system are advantageous in that the recording bits recorded on the perpendicular magnetic recording medium have more stable remnant magnetization at a higher recording density owing to the effect of a demagnetizing field from adjacent recording bits. As a result, a perpendicular magnetic recording medium exhibits excellent resistance against thermal fluctuation.

A perpendicular magnetic recording medium is provided with a soft magnetic underlayer composed of a soft magnetic material between a substrate and a recording layer. The soft magnetic underlayer sharply draws in the magnetic field generated by a magnetic head and decreases gradient of the magnetic field, to reduce influence of diffused writing signal.

For attaining higher recording density in a perpendicular magnetic recording medium, which exhibits superiorities over a conventional longitudinal magnetic recording medium, the perpendicular magnetic recording medium needs fine magnetic crystal grains, isolation between the grains, and reduction in orientation dispersion $\Delta\theta 50$ of the c-axis, the axis of easy magnetization of the magnetic layer. Effective means directed to satisfying these conditions have been disclosed as follows.

T. Oikawa, et al., *IEEE Transactions on Magnetics*, vol. 38, no. 5. September 2002 discloses a technology to form a granular magnetic layer on a ruthenium intermediate layer.

Japanese Unexamined Patent Application Publication No. 2008-034060 discloses reduction of orientation dispersion $\Delta\theta 50$ by an orientation control layer of a nonmagnetic material mainly composed of NiCr or NiCu under a ruthenium intermediate layer.

Japanese Unexamined Patent Application Publication No. 2002-358617 discloses improvement in orientation in a magnetic recording layer by using an intermediate layer of NiFeCr under the magnetic recording layer.

Japanese Unexamined Patent Application Publication No. 2008-084413 discloses use of another material, FeCoB, in a seed layer.

Japanese Unexamined Patent Application Publication No. 2004-310944 discloses a perpendicular magnetic recording medium comprising a substrate and a recording lamination body formed on the substrate. The recording lamination body includes a plurality of magnetic layers and nonmagnetic layers that are alternately laminated in a repeated construction by epitaxial growth from each other and have lattice constants different from each other of corresponding crystal axes in a surface perpendicular to the direction of the epitaxial growth. The medium disclosed in Japanese Unexamined Patent Application Publication No. 2004-310944 further comprises a soft magnetic underlayer, seed layers formed on the soft magnetic underlayer, and a nonmagnetic intermediate layer formed on the seed layers. The recording lamination body is formed by epitaxial growth over the seed layers through the nonmagnetic intermediate layer The seed layers consists of a nonmagnetic seed layer and a crystalline soft magnetic seed layer formed on the nonmagnetic seed layer, wherein the crystalline soft magnetic seed layer has an fcc structure and a direction of epitaxial growth of [111] direction.

Japanese Unexamined Patent Application Publication No. 2005-196898 discloses a perpendicular magnetic recording medium comprising a nonmagnetic substrate; and at least an underlayer, a magnetic recording layer, and a coating layer successively laminated on the substrate. The magnetic recording layer is composed of a lamination of magnetic layers of different materials. A magnetic layer in the underlayer side (a granular magnetic layer) comprises ferromagnetic crystal grains and nonmagnetic grain boundaries composed of oxides or nitrides. A magnetic layer in the coating layer side (non-granular magnetic layer) comprises ferromagnetic crystal grains and nonmagnetic grain boundaries with a concentration of non-ferromagnetic component set at a higher concentration than that of the same non-ferromagnetic component as non-ferromagnetic component in the ferromagnetic crystal grains. The magnetic layer in the coating layer side is formed after heat treatment on the nonmagnetic substrate having the magnetic layer in the underlayer side formed thereon. Japanese Unexamined Patent Application Publication No. 2005-196898 discloses such a medium that is further provided with a seed layer beneath the underlayer.

As described above, many techniques have been proposed for enhancing recording density of perpendicular magnetic recording media. However, performance of a perpendicular magnetic recording medium depends on the items including the component and composition of each of the laminated layers and the sequence of lamination. The techniques proposed thus far are not favorable with respect to all of the items, resulting in both merits on the one item and demerits on the other item. Therefore, further improvements in performance are required of the perpendicular magnetic recording media today.

The present invention is directed to overcoming or at least reducing the effects of one or more of the problems set forth above.

SUMMARY OF THE INVENTION

In view of the above, it is desirable to provide a magnetic recording medium exhibiting a high recording density performance in particular.

A perpendicular magnetic recording medium of the invention has a soft magnetic underlayer, a first seed layer, a second seed layer, an intermediate layer, a granular magnetic recording layer, a non-granular magnetic recording layer, a protective layer, and a lubricant layer laminated on a nonmagnetic substrate in this order, the first seed layer containing cobalt, nickel, and at least one element selected from a group consisting of Si, Cr, V, Zr, Nb, Ta, Ti, Cu, and Mo, and the second seed layer containing nickel, chromium, and at least one element selected from a group consisting of Si, V, Zr, Nb, Ta, Ti, Cu, and Mo.

The perpendicular magnetic recording media of the invention can be used in various types of perpendicular magnetic recording and reproduction devices.

Preferably in a perpendicular magnetic recording medium of the invention, the granular magnetic recording layer includes ferromagnetic crystal grains composed of a cobalt-based alloy and nonmagnetic grain boundaries composed of an oxide(s) of at least one element selected from a group consisting of Cr, Co, Si, Al, Ti, Ta, Hf, and Zr.

Preferably in a perpendicular magnetic recording medium of the invention, the non-granular magnetic recording layer includes ferromagnetic crystal grains composed of a cobalt-based alloy and nonmagnetic crystal grains composed of at least one element selected from a group consisting of Ta, Pt, B, Si, Nb, Cu, and Ti.

Preferably in a perpendicular magnetic recording medium of the invention, a thickness of the first seed layer is in a range of 2 to 8 nm. Preferably in a perpendicular magnetic recording medium of the invention, a thickness of the second seed layer is in a range of 2 to 12 nm.

Preferably, a misfit between fcc (220) lattice planes of the first seed layer and of the second seed layer is in the range of −4.5% to +4.5%.

Preferably, a misfit between crystal lattice planes perpendicular to the substrate of the second seed layer and of the intermediate layer is in a range of +5.3% to +6.8%.

Preferably, the nonmagnetic substrate can be substantially composed of glass, aluminum, or silicon.

High recording density performance is accomplished in a perpendicular magnetic recording medium of the invention having two seed layers each composed of a specified material to enhance alignment of orientation in the magnetic recording layer.

BRIEF DESCRIPTION OF THE DRAWINGS

The foregoing advantages and features of the invention will become apparent upon reference to the following detailed description and the accompanying FIGURE of drawing which is a sectional view of a perpendicular magnetic recording medium of the invention.

DETAILED DESCRIPTION OF SPECIFIC EMBODIMENTS

The perpendicular magnetic recording medium of the invention will be described in detail in the following with reference to the accompanying drawing.

The sole FIGURE of drawing is a sectional view of a perpendicular magnetic recording medium of the invention. Referring to this drawing FIGURE, perpendicular magnetic recording medium 10 has soft magnetic underlayer 14, first seed layer 16, second seed layer 18, intermediate layer 20, granular magnetic recording layer 22, non-granular magnetic recording layer 24, protective layer 26, and lubricant layer 28 in this order on nonmagnetic substrate 12. Perpendicular magnetic recording medium 10 shown in the FIGURE has construction components of two seed layers 16, 18. By appropriately selecting the materials of first and second seed layers 16, 18, good alignment of orientation is achieved in magnetic recording layers 22, 24, obtaining good electromagnetic conversion performance and attaining high recording density.

Nonmagnetic Substrate 12

Nonmagnetic substrate 12 is a construction component disposed at the bottom of perpendicular magnetic recording medium 10 for forming and supporting other construction components 14 to 28 of medium 10, which will be described afterwards. Nonmagnetic substrate 12 can be composed not only of NiP-plated aluminum alloy, strengthened glass, and crystallized glass, which are used in ordinary magnetic recording media, but also of silicon.

Nonmagnetic substrate 12 is preferably cleaned before forming other construction components from 14 to 28. The cleaning can be carried out by scrubbing with a blush, high pressure water jet, or immersion in an alkali detergent. Ultra violet light irradiation can be additionally conducted after the cleaning by the above-mentioned processes.

Soft Magnetic Underlayer 14

Soft magnetic underlayer 14 is a construction component provided on nonmagnetic substrate 12 for ensuring sufficient vertical magnetic field to inhibit diffusion of the magnetic flux generated by a magnetic head on information recording. Useful materials for soft magnetic underlayer 14 include nickel alloys, iron alloys, and cobalt alloys. Use of an amorphous material selected from CoZrNb, CoTaZr, CoTaZrNb, CoFeNb, CoFeZrNb, CoNiFeZrNb, and CoFeTaZrNb in particular, provides good electromagnetic conversion characteristics.

Soft magnetic underlayer 14 can be formed by any methods and conditions known in the art such as sputtering methods including a DC magnetron sputtering method and an RF magnetron sputtering method, and a vacuum deposition method.

A thickness of soft magnetic underlayer 14 can be appropriately varied corresponding to the structure and characteristics of a magnetic head used for information recording, and a preferable thickness is in a range of 10 nm to 100 nm in consideration for productivity. A thickness larger than 10 nm ensures sufficient vertical magnetic field on the one hand, and a thickness smaller than 100 nm improves productivity.

First Seed Layer 16

First seed layer 16 is a construction component that favorably controls orientation and grain size of second seed layer 18 that is formed on this first seed layer 16, which results in favorable control of orientation of intermediate layer 20, which in turn brings about good vertical orientation of granular magnetic recording layer 22. In order for first seed layer 16 to fulfill this function, a crystal structure thereof is preferably an fcc structure. Since the crystal structures of intermediate layer 20 and magnetic recording layers 22, 24 are hcp structures, a type of closest packed structure of atoms (packing factor of 74%), seed layers 16, 18 positioned under these layers 20, 22, 24 give good alignment of orientation to intermediate layer 20 and magnetic recording layers 22, 24 when seed layers 16, 18 have the crystal structure of fcc structure that is also a type of closest packed structure of atoms. The reason for selecting the fcc structure for a crystal structure of seed layers 16, 18 from the two types of closest packed structures of atoms is that a film of good crystallinity can be formed still in a thin film range, although precise mechanism is unknown.

A material with the fcc structure useful in the first seed layer 16 contains cobalt, nickel, and at least one element selected from the group consisting of Si, Cr, V, Zr, Nb, Ta, Ti, Cu, and Mo, for example, CoNiCr, CoNiCrSi, CoNiNb, CoNiNbSi, CoNiTa, CoNiMo, CoNiTi, and CoNiVCu.

A thickness of first seed layer 16 can be appropriately varied so as to obtain desired values of magnetic properties and electromagnetic conversion characteristics of magnetic recording layers 22, 24, and preferably in the range of 2 nm to 8 nm. A thickness larger than 2 nm ensures sufficient crystallinity of first seed layer 16, which attains excellent orientation of layers from 18 to 24 disposed over first seed layer 16, providing good S/N ratio (signal-to-noise ratio) of perpendicular magnetic recording medium 10. A thickness less than 8 nm on the other hand, restrains an excessively large grain size of first seed layer 16, which in turn suppresses swelling of the grains of layers from 18 to 24 disposed over first seed layer 16, attaining good S/N ratio.

First seed layer 16 can be formed by any methods and conditions known in the art such as sputtering methods including a DC magnetron sputtering method and an RF magnetron sputtering method, and a vacuum deposition method.

Second Seed Layer 18

Second seed layer 18 is a construction component that follows good orientation of first seed layer 16 and achieves good orientation, grain size, and surface configuration of intermediate layer 20 formed on second seed layer 18. In order for second seed layer 18 to exhibit these functions sufficiently, the crystal structure thereof is preferably an fcc structure as in first seed layer 16.

A material with the fcc structure useful in the second seed layer 18 contains nickel, chromium, and at least one element selected from the group consisting of Si, V, Zr, Nb, Ta, Ti, Cu and Mo, for example, NiCrSi, NiCrV, NiCrTa, NiCrMo, NiCrTaZr, NiCrZr, NiCrNb, NiCrTi, and NiCrTiCu.

A thickness of second seed layer 18 can be appropriately varied so as to obtain desired values of magnetic properties and electromagnetic conversion characteristics of magnetic recording layers 22, 24, and is preferably in the range of 2 nm to 12 nm. A thickness larger than 2 nm ensures sufficient crystallinity of second seed layer 18, which attains excellent orientation of layers from 20 to 24 disposed over second seed layer 18, providing good S/N ratio of perpendicular magnetic recording medium 10. A thickness less than 12 nm on the other hand, restrains an excessively large grain size of second seed layer 18, which in turn suppresses swelling of the grains of layers from 20 to 24 disposed over second seed layer 18, to provide good S/N ratio.

Preferably, a misfit between fcc (220) lattice planes of the first seed layer and of the second seed layer is in the range of −4.5% to +4.5%. Here, the misfit between fcc (220) lattice planes of the first seed layer and of the second seed layer is defined to be [(a spacing between (220) lattice planes in second seed layer 18)−(a spacing between (220) lattice planes in first seed layer 16)]/[a spacing between (220) lattice planes in second seed layer 18]. The misfit is an indicator meaning the difference between the sizes of unit cells of the crystals in the two laminated vertically adjacent layers. A misfit in the range of −4.5% to +4.5% suppresses undesirable initial growth due to misfit of lattices of first seed layer 16 and second seed layer 18, transferring a good orientation of first seed layer 16 to second seed layer 18, thereby providing second seed layer 18 with good orientation. The spacing of (220) lattice planes of first and second seed layers 16, 18 can be measured by means of an X-ray diffractometer: XRD.

Preferably, a misfit between crystal lattice planes perpendicular to substrate 12, of second seed layer 18 and of intermediate layer 20 is in the range of +5.3% to +6.8%. Here, the misfit between crystal lattice planes perpendicular to substrate 12, of second seed layer 18 and of intermediate layer 20 is defined by [(the spacing of hcp (11-20) lattice planes of intermediate layer 20)−(the spacing of hcp (11-20) lattice planes of second seed layer 18)]/[the spacing of hcp (11-20) lattice planes of intermediate layer 20]. The misfit is an indicator meaning the difference between the sizes of unit cells of the crystals in the two laminated vertically adjacent layers. The misfit not smaller than +5.3% forms appropriate irregularities on the surface of intermediate layer 20, providing favorable isolation at the interface between magnetic recording layer 22 and intermediate layer 20, thereby attaining good S/N ratio in magnetic recording medium 10. The irregularities are generated on the surface of intermediate layer 20 by an in-plane compressive stress in intermediate layer 20 which is produced by the appropriately larger lattices in intermediate layer 20 than those in second seed layer 18. The misfit not larger than 6.8% on the other hand, brings about good lattice matching between second seed layer 18 and intermediate layer 20, achieving alignment of orientation of intermediate layer 20 at a high level.

Second seed layer 18 can be formed by any methods and conditions known in the art such as sputtering methods including a DC magnetron sputtering method and an RF magnetron sputtering method, and a vacuum deposition method.

Intermediate Layer 20

Intermediate layer 20 is a nonmagnetic construction component for improving orientation of magnetic recording layers 22, 24, for controlling the grain sizes of layers 22, 24, and in addition, for suppressing generation of an initial growth layer in layers 22, 24. In order for intermediate layer 20 to exhibit such functions, intermediate layer 20 is preferably composed of a material having the hcp structure such as Ru, Re, Ti, Zr, Nd, Tm, or Hf.

A thickness of intermediate layer 20 is preferably in the range of 3 nm to 20 nm. A thickness not smaller than 3 nm provides intermediate layer 20 with good crystallinity achieving good orientation, thereby attaining good orientation and good isolation between crystal grains in magnetic recording layers 22, 24 that are disposed on intermediate layer 20. A thickness of intermediate layer 20 not smaller than 3 nm also suppresses formation of an initial growth layer in magnetic recording layers 22, 24. A thickness of intermediate layer 20 not larger than 20 nm on the other hand, suppresses swelling of the crystal grains in intermediate layer 20 resulting in suppression of swelling of crystal grains in granular magnetic recording layer 22, thereby attaining an excellent S/N ratio owing to noise reduction in magnetic recording medium 10.

Intermediate layer 20 can be formed by any methods and conditions known in the art such as sputtering methods including a DC magnetron sputtering method and an RF magnetron sputtering method, and a vacuum deposition method.

Granular Magnetic Recording Layer 22

Granular magnetic recording layer 22 is a construction component for recording information. Granular magnetic recording layer 22, when used for a construction component of a perpendicular magnetic recording medium, needs to have an axis of easy magnetization oriented in the direction perpendicular to the substrate surface. Specifically, the hcp (0002) plane is oriented preferably in parallel to the substrate surface. Granular magnetic recording layer 22 preferably has a configuration of so-called granular structure in which ferromagnetic crystal grains of cobalt-based alloy are surrounded by nonmagnetic grain boundaries composed mainly of an oxide. The granular structure secures satisfactory electromagnetic conversion performance of granular magnetic recording layer 22, attaining an excellent S/N ratio owing to noise reduction in magnetic recording medium 10. Here, the wording "composed mainly of an oxide" does not exclude a minor amount of other components, and means that the oxide is contained in a proportion larger than about 90 mol % in the nonmagnetic grain boundaries.

A cobalt-based alloy for composing the ferromagnetic crystal grains can be selected from CoPt-based alloys such as CoPtCr, CoPt, CoPtSi, and CoPtCrB, and CoCr-based alloys such as CoCr, CoCrTa, and CoCrTaPt. Among them, the CoPt-based alloys are preferable because a high anisotropy energy Ku can be set.

An oxide for composing the nonmagnetic grain boundaries can be selected from $SiO_2$, $Cr_2O_3$, $ZrO_2$, and $Al_2O_3$, which exhibit good performance to magnetically isolate the ferromagnetic crystal grains of the cobalt-based alloy. Among them, $SiO_2$ is preferable because it exhibits excellent performance to magnetically isolate the ferromagnetic crystal grains of the cobalt-based alloy.

Granular magnetic recording layer 22 can be formed by any methods and conditions known in the art such as sputtering methods including a DC magnetron sputtering method and an RF magnetron sputtering method, and a vacuum deposition method.

Non-granular Magnetic Recording Layer 24

Non-granular magnetic recording layer 24 is a construction component disposed on granular magnetic recording layer 22 for secure high durability of magnetic recording medium 10 and controls favorably the magnetic performance of magnetic recording layers 22, 24 as a whole. Non-granular magnetic recording layer 24 has preferably a structure including ferromagnetic crystal grains composed of a cobalt-based alloy and nonmagnetic crystal grains of a metallic material without containment of metal oxide and nitride. A non-granular structure can block cobalt atoms dissolved out of the ferromagnetic crystal grains in granular magnetic recording layer 22, securing high durability of magnetic recording medium 10 and controls favorably the magnetic performance of magnetic recording layers 22, 24 as a whole.

A cobalt-based alloy for composing the ferromagnetic crystal grains in non-granular magnetic recording layer 24 can be selected from CoPt-based alloys such as CoPtCr, CoPt, CoPtSi, and CoPtCrB, and CoCr-based alloys such as CoCr, CoCrTa, and CoCrTaPt. Among them, the CoPt-based alloys are preferable because a high anisotropy energy Ku can be set.

A metallic material(s) for composing the nonmagnetic crystal grains can be selected from Ta, Pt, B, Si, Nb, Cu, and Ti. Among them, boron is preferable because it exhibits excellent performance to magnetically isolate the ferromagnetic crystal grains of the cobalt-based alloy.

Non-granular magnetic recording layer 24 can be formed by any methods and conditions known in the art such as sputtering methods including a DC magnetron sputtering method and an RF magnetron sputtering method, and a vacuum deposition method, as in the case of granular magnetic recording layer 22.

Protective Layer 26

Protective layer 26 is a construction component provided for protecting the layers indicated by reference numerals 14 through 24 locating under protective layer 26 in the sectional view of magnetic recording medium 10 of the FIGURE, and in addition, for hindering cobalt elution from granular magnetic recording layer 22. Protective layer 26 can be composed of any material commonly used in perpendicular magnetic recording media. Useful materials include carbon materials such as diamond like carbon (DLC) and amorphous carbon, and other thin film materials known as protective layer materials of magnetic recording media. A thickness of protective layer 26 can be the one commonly used in a protective layer as a construction component of a perpendicular magnetic recording medium.

Protective layer 26 can be formed in general by means of sputtering methods including a DC magnetron sputtering method and an RF magnetron sputtering method, a vacuum deposition method, and a CVD method.

Lubricant Layer 28

Lubricant layer 28 is an optionally provided construction component in a liquid state for reducing the frictional force generated between protective layer 26 and a magnetic head (not shown in the FIGURE), thereby achieving good durability and reliability of magnetic recording medium 10. Lubricant layer 28 can be composed of a material commonly used in magnetic recording media, for example, a perfluoropolyether lubricant. A thickness of lubricant layer 28 can be the one commonly used in a lubricant layer as a construction component of a perpendicular magnetic recording medium. Lubricant layer 28 can be formed by any application methods known in the art such as a dip-coating method, a spin-coating method, and the like.

EXAMPLES

The following describes some preferred embodiment examples showing the effects of the invention. It should be acknowledged that the examples are merely representatives for illustrating the invention and should not limit the invention.

Manufacturing a Perpendicular Magnetic Recording Medium

Example 1

A magnetic recording medium having a basic construction of the FIGURE was manufactured. Nonmagnetic substrate 12 of a chemically strengthened glass substrate (N-5 glass substrate manufactured by HOYA Corporation) having a diameter of 65 mm and a thickness of 0.635 mm was prepared. After introducing the substrate into a sputtering apparatus, soft magnetic underlayer 14 of CoZrNb 60 nm thick was formed using a target of Co5Zr8Nb (the numerals in this expression represent molar percentage of the element following the numeral, indicating 5 mol % of Zr, 8 mol % of Nb, and remainder of Co in this example. The same expression is used below.)

Then, first seed layer 16 with a thickness of 3 nm was formed under an argon gas pressure of 20 Pa using a target of Co35Ni25Cr2Si, and second seed layer 18 with a thickness of 8 nm was formed under an argon gas pressure of 20 Pa using a target of Ni20Cr2Si.

Subsequently, nonmagnetic intermediate layer 20 with a thickness of 12 nm was formed under an argon gas pressure of 4.0 Pa using a ruthenium target.

Then, granular magnetic recording layer 22 with a thickness of 8 nm was formed under an argon gas pressure of 4.0 Pa using a target of 90 mol % (Co8Cr16Pt)–8 mol % $SiO_2$, and a non-granular magnetic recording layer 24 with a thickness of 7 nm was formed under an argon gas pressure of 2.0 Pa using a target of Co20Cr12Pt3Cu. All of above-described layers 14 through 24 were formed by means of a DC magnetron sputtering method.

Then, protective layer 26 of carbon with a thickness of 2.5 nm was formed by means of a CVD method. After that, the laminated article was taken out of the vacuum device.

Then, on the resulting laminated article, liquid lubricant layer 28 of perfluoropolyether with a thickness of 1.5 nm was formed by means of a dip-coating method. Thus, a perpendicular magnetic recording medium of Example 1 was obtained.

Example 2

A perpendicular magnetic recording medium of Example 2 was manufactured in the same manner as in Example 1 except that first seed layer 16 was composed of Co35Ni4Nb2Si.

Example 3

A perpendicular magnetic recording medium of Example 3 was manufactured in the same manner as in Example 1 except that second seed layer 18 was composed of Ni20Cr5Mo.

Example 4

A perpendicular magnetic recording medium of Example 4 was manufactured in the same manner as in Example 1 except that first seed layer 16 was composed of Co35Ni4Nb2Si and second seed layer 18 was composed of Ni20Cr5Mo.

Comparative Example 1

A perpendicular magnetic recording medium of Comparative Example 1 was manufactured in the same manner as in Example 1 except that second seed layer 18 was not formed.

Comparative Example 2

A perpendicular magnetic recording medium of Comparative Example 2 was manufactured in the same manner as in Example 1 except that first seed layer 16 was composed solely of platinum.

Comparative Example 3

A perpendicular magnetic recording medium of Comparative Example 3 was manufactured in the same manner as in Example 1 except that first seed layer 16 was composed solely of copper and second seed layer 18 was composed solely of nickel.

Evaluation Items

The perpendicular magnetic recording media of Examples 1 through 4 and Comparative Examples 1 through 3 were evaluated for a characteristic involved in the S/N ratio of the perpendicular magnetic recording media, an orientation dispersion $\Delta\theta 50$ of granular magnetic recording layer 22, the misfit between the fcc (220) lattice planes of the first seed layer 16 and of second seed layer 18 (hereinafter also referred to simply as "a misfit 1"), and the misfit between the lattice planes perpendicular to substrate 12 of second seed layer 18 and of intermediate layer 20 (hereinafter also referred to simply as "a misfit 2").

The evaluated characteristic involved in the S/N ratio was SNRm of the medium (reproduction output signal S: a peak output value of an isolated waveform in magnetization inversion at a linear recording density of 716 kFCl, Nm: an rms value (root mean square-inch) at 60 kFCl). The SNRm was measured by writing-in a signal using a single-pole-type head and reading-out using an MR head. The reproduced output signal S was a half of the difference between the maximum value and the minimum value of the output. This value is larger the more favorable. The result of the evaluation on the SNRm is given in Table 1.

The orientation dispersion $\Delta\theta 50$ was obtained as follows. A $\theta-2\theta$ measurement was conducted using an X-ray diffraction apparatus; a $2\theta$ value was measured from the peak top of the hcp (0002) plane of granular magnetic recording layer 22 parallel to substrate 12; and $\theta$ scanning was carried out at a fixed $2\theta$ value. The half width of the peak in the $\theta$ scanning was the orientation dispersion $\Delta\theta 50$. The orientation dispersion $\Delta\theta 50$ is an indicator of dispersion of the axis of easy magnetization, and a smaller value is more favorable. The result of evaluation of the orientation dispersion $\Delta\theta 50$ is also given in Table 1.

The misfit 1 was obtained as follows. The $\omega-2\theta_X$ scanning was conducted using a 4-axes X-ray diffraction apparatus; from the $2\theta_X$ peak position, the spacing between the fcc (220) lattice planes in the first seed layer 16 and the spacing (220) between the fcc (220) lattice planes in second seed layer 18 were obtained; and calculation was carried out to obtain a value: [(a spacing between (220) lattice planes in second seed layer 18)−(a spacing between (220) lattice planes in first seed layer 16)]/[a spacing between (220) lattice planes in second seed layer 18], which is the misfit 1. A numerical value of the misfit 1 is smaller the more favorable. The results on the misfit 1 are given in Table 1.

The misfit 2 was obtained as follows. The $\omega-2\theta_X$ scanning was conducted using a 4-axes X-ray diffraction apparatus; from the $2\theta_X$ peak position, the spacing between the fcc (220) lattice planes in second seed layer 18 and the spacing between the hcp (11-20) lattice planes perpendicular to substrate 12 in intermediate layer 20 were measured; and calculation was carried out to obtain a value: [(the spacing of hcp (11-20) lattice planes of intermediate layer 20)−(the spacing of fcc (220) lattice planes of second seed layer 18)]/[the spacing of hcp (11-20) lattice planes of intermediate layer 20], which is the misfit 2. The misfit 2 is favorably in the range from +5.3 to +6.8. Obtained values of misfit 2 are also given in Table 1.

TABLE 1

|  | SNRm (dB) | $\Delta\theta 50$ (*1) | misfit 1 (%) | misfit 2 (%) |
| --- | --- | --- | --- | --- |
| Example 1 | 14.5 | 2.8 | 2.8–3.0 | 5.9–6.5 |
| Example 2 | 14.8 | 2.6 | 1.8–2.0 | 5.8–6.4 |
| Example 3 | 14.6 | 2.7 | 1.9–2.1 | 5.9–6.5 |
| Example 4 | 14.7 | 2.6 | 1.6–1.8 | 5.8–6.4 |
| Comp Ex 1 | 14.0 | 3.0 | — | 4.8–5.3 |
| Comp Ex 2 | 13.5 | 4.0 | −5.7–−6.3 | 5.9–6.5 |
| Comp Ex 3 | 13.8 | 3.8 | −2.4–−2.6 | 7.1–7.9 |

(*1) orientation dispersion in magnetic recording layer

As shown in Table 1, Examples 1 through 4, which are embodiment examples according to the present invention, exhibited large SNRm values, small orientation dispersion $\Delta\theta 50$ in the magnetic recording layer, small values of misfit 1 within the range of −4.5 to +4.5, and numerical values of misfit 2 within the range between +5.3 and +6.8. Thus, favorable results have been demonstrated in all evaluation items. Particularly, Examples 2 through 4, in which the material of first seed layer 16 or second seed layer 18 was changed from that in Example 1, exhibited better results of higher SNRm values and a little lower $\Delta\theta 50$ values than Example 1. This result can be brought about due to smaller values of misfit 1 in Examples 2 through 4 than in Example 1, which caused different surface irregularities on the intermediate layer 20 of Examples 2 through 4 from those in Example 1.

In contrast, Comparative Examples 1 through 3, which are outside the scope of the present invention, exhibited unfavorable result in at least one of the evaluation items of SNRm, orientation dispersion $\Delta\theta 50$ in the magnetic recording layer, misfit 1, and misfit 2.

Specifically, Comparative Example 1 without second seed layer 18 does not provide the effect to form appropriate irregularities on the surface of nonmagnetic intermediate layer 20, failing to produce favorable result in the misfit 2. Comparative Example 1, in comparison with Example 1, resulted in an SNRm value smaller by 0.5 dB and a little higher $\Delta\theta 50$ value of the magnetic recording layer. The degradation of the $\Delta\theta 50$ value of the magnetic recording layer can be attributed to the lack of second seed layer 18 and another factor. It may be another factor for $\Delta\theta 50$ degradation that appropriate irregularities are not formed on the surface of the nonmagnetic intermediate layer causing poor isolation characteristic at the interface between the magnetic recording layer and the intermediate layer.

Comparative Example 2, in which the material of first seed layer 16 is outside the scope of the present invention, does not provide the effect to suppress the unfavorable initial growth due to lattice mismatching between first seed layer 16 and second seed layer 18, failing to produce favorable result on the misfit 1. Comparative Example 3, despite good result in the misfit 1, did not exhibited good result in the misfit 2. Consequently, orientation degradation was caused due to lattice mismatching between second seed layer 18 and nonmagnetic intermediate layer 20.

Comparing Comparative Examples 2 and 3 with Example 1, Comparative Examples 2 and 3, having first seed layer 16 that is outside the scope of the present invention, can be considered to have failed to obtain intermediate layer 20 with favorable orientation, grain size, and surface configuration. As a result, the misfit value was beyond the range to avoid lattice mismatching, which led to significant degradation of the Δθ50 value of the magnetic recording layer as compared with Example 1, also degrading the SNRm value by 0.7 dB to 1 dB.

A perpendicular magnetic recording medium of the invention comprises two seed layers each formed of specified material that favorably controls the misfit between the first seed layer and the second seed layer and the misfit between the second seed layer and the intermediate layer, thereby obtaining a favorable SNRm value and orientation dispersion Δθ50 in the magnetic recording layer, attaining high recording density. Therefore, the present invention is effective in application to the field of perpendicular magnetic recording media in which high recording density is earnestly desired.

Thus, a perpendicular magnetic recording medium has been described according to the present invention. Many modifications and variations may be made to the techniques and structures described and illustrated herein without departing from the spirit and scope of the invention. Accordingly, it should be understood that the devices and methods described herein are illustrative only and are not limiting upon the scope of the invention.

This application is based on, and claims priority to, Japanese Patent Application No. 2008-224793, filed on Sep. 2, 2008. The disclosure of the priority application in its entirety, including the drawings, claims, and the specification thereof, is incorporated herein by reference.

| | |
|---|---|
| 10: | perpendicular magnetic recording medium |
| 12: | nonmagnetic substrate |
| 14: | soft magnetic underlayer |
| 16: | first seed layer |
| 18: | second seed layer |
| 20: | intermediate layer |
| 22: | granular magnetic recording layer |
| 24: | non-granular magnetic recording layer |
| 26: | protective layer |
| 28: | lubricant layer |

What is claimed is:

1. A perpendicular magnetic recording medium comprising:
   a soft magnetic underlayer,
   a first seed layer,
   a second seed layer,
   an intermediate layer,
   a granular magnetic recording layer,
   a non-granular magnetic recording layer,
   a protective layer, and
   a lubricant layer
   laminated on a nonmagnetic substrate in this order, the first seed layer containing cobalt, nickel, and at least one element selected from a group consisting of Si, Cr, V, Zr, Nb, Ta, Ti, Cu, and Mo, and the second seed layer containing nickel, chromium, and at least one element selected from a group consisting of Si, V, Zr, Nb, Ta, Ti, Cu, and Mo,
   wherein a misfit between crystal lattice planes perpendicular to the substrate of the second seed layer and of the intermediate layer is in a range of +5.3% to +6.8%.

2. The perpendicular magnetic recording medium according to claim 1, wherein the granular magnetic recording layer comprises ferromagnetic crystal grains composed of a cobalt-based alloy and nonmagnetic grain boundaries composed of an oxide(s) of at least one element selected from a group consisting of Cr, Co, Si, Al, Ti, Ta, Hf, and Zr.

3. The perpendicular magnetic recording medium according to claim 1, wherein the non-granular magnetic recording layer comprises ferromagnetic crystal grains composed of a cobalt-based alloy and nonmagnetic crystal grains composed of at least one element selected from a group consisting of Ta, Pt, B, Si, Nb, Cu, and Ti.

4. The perpendicular magnetic recording medium according claim 1, wherein a thickness of the first seed layer is in a range of 2 to 8 nm.

5. The perpendicular magnetic recording medium according to claim 1, wherein a thickness of the second seed layer is in a range of 2 to 12 nm.

6. The perpendicular magnetic recording medium according to claim 1, wherein a misfit between fcc (220) lattice planes of the first seed layer and of the second seed layer is in a range of −4.5% to +4.5%.

7. The perpendicular magnetic recording medium according to claim 1, wherein the nonmagnetic substrate is substantially composed of glass, aluminum, or silicon.

8. The perpendicular magnetic recording medium according to claim 2, wherein the non-granular magnetic recording layer comprises ferromagnetic crystal grains composed of a cobalt-based alloy and nonmagnetic crystal grains composed of at least one element selected from a group consisting of Ta, Pt, B, Si, Nb, Cu, and Ti, a thickness of the first seed layer is in a range of 2 to 8 nm, and a thickness of the second seed layer is in a range of 2 to 12 nm.

9. The perpendicular magnetic recording medium according to claim 8, wherein a misfit between fcc (220) lattice planes of the first seed layer and of the second seed layer is in a range of −4.5% to +4.5% and a misfit between crystal lattice planes perpendicular to the substrate of the second seed layer and of the intermediate layer is in a range of +5.3% to +6.8%.

10. The perpendicular magnetic recording medium according to claim 9, wherein the nonmagnetic substrate is substantially composed of glass, aluminum, or silicon.

11. The perpendicular magnetic recording medium according to claim 1, wherein the first seed layer contains an alloy consisting of cobalt, nickel, and at least one element selected from a group consisting of Si, Cr, V, Zr, Nb, Ta, Ti, Cu, and Mo, and the second seed layer contains an alloy consisting of nickel, chromium, and at least one element selected from a group consisting of Si, V, Zr, Nb, Ta, Ti, Cu, and Mo.

12. The perpendicular magnetic recording medium according to claim 1, wherein the first seed layer is selected from the group consisting of CoNiCr, CoNiCrSi, CoNiNb, CoNiNbSi, CoNiTa, CoNiMo, CoNiTi, and CoNiVCu.

* * * * *